Patented Mar. 29, 1949

2,465,855

UNITED STATES PATENT OFFICE 2,465,855

ARYLIDENE ALICYCLIC KETONE INSECTICIDE

Stephen C. Dorman and Seaver A. Ballard, Oakland, Calif., assignors to Shell Development Company, San Francisco, Calif., a corporation of Delaware No Drawing. Application October 8, 1945, Serial No. 621,160

11 Claims. (Cl. 167—24)

This invention relates to new and novel compositions which are particularly suitable for killing noxious insects and the like. More specifically, the invention is concerned with insecticidal compositions containing arylidene alicyclic ketones and their derivatives, particularly of the class having the general structural formula

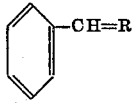

where R is a ketonic alicyclic radical, which may be saturated or unsaturated; both the aryl and the ketonic radicals may or may not have various substituents attached to one or more of the carbon atoms of the nuclei.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, free from injurious effect and offensive odor to human beings, and not have the tendency to stain walls, fabrics, etc.

It is an object of the present invention to provide an insecticidal composition which is highly toxic to insects but of low toxicity to human beings and other warm-blooded animals. Another object is to provide new insecticidal compositions which can be prepared from readily available domestic and inexpensive materials. A further object is to provide an improved iinsecticidal composition containing a fast-acting synthetic toxicant which is stable toward light. A still further object of this invention is to provide an activator for toxic plant extracts such as pyrethrum and derris resin or rotenone in insecticidal compositions. Still another object is to provide certain novel substituted arylidene alicyclic ketonic compounds which are suitable as an active constituent or ingredient in insecticidal compositions.

Now it has been discovered that compounds of the class of substituted or unsubstituted arylidene alicyclic ketones and their derivatives, particularly the benzylidene alicyclic ketones of the class

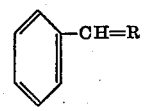

where R is a ketonic alicyclic radical (which may be further substituted), are highly effective insecticidal agents and do not have the above-described defects possessed by pyrethrum, rotenone, and many of the synthetic organic compounds available or proposed in this country as toxicants for insecticidal compositions. These arylidene alicyclic ketones may be produced in a number of ways, as for example, by aldol-type condensations of benzaldehyde or substituted benzaldehydes with alicyclic ketones such as isophorone or cyclohexanone. As examples of especially effective compounds in insecticidal compositions, the following are suitable: benzylidene isophorone, benzylidene cyclohexanone, benzylidene methylcyclohexanones, benzylidene methylcyclohexenone, benzylidene dimethylcyclohexanone, benzylidene dimethylcyclohexenone, methylbenzylidene cyclohexanone, methylbenzylidene isophorone, dimethylbenzylidene cyclohexenone, dimethylbenzylidene isophorone, and the like, their homologues and analogues, and substituted derivatives thereof, particularly those described below.

The above defined compounds either alone or in combination with other active or inactive substances, may be applied to plants, animals, fabrics and the like, by spraying, dusting, pouring, dipping, etc., in the form of concentrated liquids, solutions, colloidal dispersions, emulsions of one solution within another liquid medium or partial solution, emulsions of one liquid in another, emulsions of oil in water, suspensions, dusting powders, and the like, containing such concentration of the active compound or compounds as is most suitable for the particular purpose for which they are to be used. The aryl'dene alicyclic ketonic compounds may be applied, for example, in the form of dilute solutions, in a suitable solvent or mixture of solvents, containing for instance lower aliphatic alcohols, aralkyl alcohols, mono- and poly-hydric alcohols, petroleum distillates, lignite tar oils, hydrogenated hydrocarbons, unsaturated hydrocarbons, paraffin oils, naphthenes, chlorinated hydrocarbons, aromatic hydrocarbons, chlorinated ethers, fenchyl alcohols, glycol ethers, acetone, ketones, aldehydes, esters, or the like or mixtures thereof.

The arylidene alicyclic ketonic compounds may also be advantageously used in combination with other insecticides or fungicides such as pyrethrum, derris resins, rotenone, nicotine, lime-sulfur, Bordeaux mixture, copper sulfate, copper carbonates, sulfur, mercury compounds, sodium arsenate, calcium arsenate, lead arsenate, iron sulfate, phenol, paradichlorobenzene, unsaturated organic chlorides, higher unsaturated amides, alkene sulfides, thiuram sulfides, thiocyanates, thiocyano ethers, thiocyano esters, isothiocyanates, ethylene glycol ether of pinene, butyl mesityl oxide oxalate, polyhalogenated compounds such as 1,1-diparachlorophenyl-2,2,2-trichloroethane, unsaturated cyclic ketols such as diisophorone and its homologs, obtained by condensation of lower ketones such as acetone, methyl ethyl ketone, etc., according to U. S. Patent 2,307,482, and the like.

As mentioned, the ketonic compounds described herein may be used as dusting insecticides for which purpose they may be mixed with or absorbed by finely divided solid particles such as wood flour, talc, pyrophyllite, clay, sulfur, lime, zinc oxide, zinc hydroxide, and carbon black or mixtures thereof.

The above-defined class of arylidene alicyclic ketones are advantageously employed as solutions or dispersions or suspensions in various hydrocarbon fractions. For instance, they may be suspended in or dissolved in light hydrocarbon oils having a viscosity range of between about 40 and about 65 seconds standard Saybolt Universal at 100° F., or in medium hydrocarbon oils having a viscosity of between about 65 and 85 seconds Saybolt Universal at 100° F., or in heavy oils having a viscosity somewhat greater than 85 seconds Saybolt Universal at 100° F. The resultant solutions or suspensions in the respective oils may then be emulsified in water. Better control of insects is thus obtained by the addition of the arylidene alicyclic ketones to the oils followed by the emulsification and dispersion of the compounds and oil in water. However, for use in household insecticides, the arylidene alicyclic ketones are preferably dissolved in a light hydrocarbon oil such as highly refined, odorless kerosene or kerosene distillate with or without the addition of other insecticides or sprays. From about 1% to 5% by volume solutions of the present toxicants are preferred in such oil sprays. The arylidene alicyclic ketones are relatively insoluble in kerosene, several of them including benzylidene isophorone having a solubility of less than 5.0 gm. per 100 ml. in kerosene at 70° F.

As specific examples, modified Peet-Grady tests were made with the arylidene alicyclic ketones of the present invention. The general test is fully described in the 1940 "Blue Book," published by the publisher of "Soap and Sanitary Chemicals" periodical, on pages 193 to 197, as the large group method. Briefly the test as practiced consists of releasing 100 to 150 flies in an air-conditioned case 6 x 6 x 6 feet and spraying them with 12 ml. of insecticide. After 10 minutes exposure the number of flies which are incapacitated or "knocked down" is noted and all flies transferred to a cage and allowed to recuperate in fresh air for 24 hours, when the dead flies are counted. For the purpose of this study the percentages knocked down at 10 minutes and killed at 24 hours were recorded, as well as the official Peet-Grady numeral rating. The results obtained by testing benzylidene isophorone in highly refined, odorless kerosene with added pyrethrum are given in the following table:

| Test No. | Agent | Amt. of Agent | Vol. of Pyrethrum Extract | 10 min. Knockdown | 24 hr. Kill | Numerical Rating |
|---|---|---|---|---|---|---|
| | | | Percent | Percent | Percent | |
| 1 | Benzylidene isophorone | 3 gms./100 ml. | 2 | 95 | 57 | +18 |
| 2 | do | 5% by volume | 5 | 96 | 70 | +36 |

The numerical rating is calculated as the difference in the percent 24 hour kill from that obtained with an odorless kerosene solution of 5% by volume of 20:1 pyrethrum extract concentrate.

Besides the control of houseflies (*Musca domestica*), the compositions containing the present arylidene alicyclic ketones may be used for eradicating or controlling various pests, such as insects, e. g. aphids, diabrotica, red spiders, thrips, etc., bacteria, and fungi, such as aspergillus, penicillium, *Sclerotium rolfsii*, etc.

In one of its aspects the present invention covers novel compositions consisting of or comprising emulsions and/or colloidally or mechanically produced dispersions containing one or more of the specified substituted or unsubstituted arylidene alicyclic ketonic compounds, a hydrocarbon, water and an emulsifying agent.

The above ketonic compounds may also be incorporated as an emulsion or as a suspension of them in water with sulfur, lime, zinc oxide, zinc hydroxide, preferably zinc hydroxide, calcium hydroxide, and with any combination of these added agents. The particular dispersion or combination of dispersions obtained depends upon the relative amounts of the components employed in the combination, and upon the specific physical properties relevant to dispersion possessed by the particular compound selected from the class of arylidene alicyclic ketones. The presence of arylidene alicyclic ketonic compounds in the mentioned emulsions or dispersions increases the toxicity of the spray oils thus obtained to such an extent as to permit a material reduction in the amount of oil required and advantageously lessen the oil deposit on plant foliage, thereby decreasing injury to the foliage, and at the same time allowing a better control of the insects.

Instead of preparing emulsions directly, it is also possible to form concentrated combinations containing or comprising the arylidene alicyclic ketones, oil, and an emulsifying agent. These concentrates, when diluted with water, yield emulsions in which the arylidene alicyclic ketone is suspended or dissolved in the non-aqueous phase.

The invention also covers three-component systems comprising the arylidene alicyclic ketones, water and a dispersing agent. The latter may comprise or consist of any one of the well known wetting and spreading agents, and particularly the known deflocculating agents.

In cases when it is desired to provide a four component system containing an oil, the emulsifying agent may be dissolved in the oil with the aid of cresylic acids, alkyl phenols, dibutyl phthalate, or other mutual solvents.

The arylidene alicyclic ketonic compounds described herein may be employed to produce inverted sprays in which said compounds, initially wetted by water, become wetted by oil prior to, or substantially at the moment of impact upon a sprayed surface. An example of the preparation of such an inverted spray is as follows: Two separate solutions are prepared, the first consisting of a mixture of one part of oleic acid and 19 parts of raw summer petroleum oil, while the second contains one part of monoethanol amine or of 25 per cent ammonia and 12 parts of water. In order to produce 100 gallons of the spray, one-half pint of the second solution is stirred into one gallon of water, and two quarts of the first solution are then added with thorough mixing. To a large volume of water in the spray tank are added three pounds of benzylidene isophorone, and when the tank is nearly full the above oil emulsion is added. Flocculation of the benzylidene isophorone occurs, and the spray may be applied to a plant foliage soon after the ingredients are mixed.

It was pointed out that various emulsifying agents, dispersing, wetting, and spreading agents may be employed in the preparation of some of the compositions defined herein. These various agents, which are well known and for example, are described in "The Chemistry and Toxicology of Insecticides" by Harold H. Shepard, 1939 edition, on page 157, cannot be distinctly separated in actual practice, for a material used for any one of these purposes usually has properties which qualifies it under several of the definitions of these agents. Therefore, herein, and in the appended claims the term "emulsifying agent" includes an agent which has properties which qualify it under several of the definitions of deflocculating agents, wetting agents, spreaders, and adhesives.

The following are illustrative examples of such "emulsifying agents": sodium lauryl sulfate, either sodium or potassium soaps of whale and fish oils, the latter soft potassium soaps being preferred, rosin soaps such as alkali metal and ammonium oleoabietates, sulfonated abietate soaps, algin soaps, saponins, dried skim milk, calcium caseinate, dried blood, blood albumin, lignin pitch (sulfite liquor or sulfite lye), gelatin, glue, and such preferred industrially prepared agents as lauryl alcohol, oleyl alcohol, stearyl alcohol, sodium oleyl sulfate, sodium lauryl sulfate, sodium sulfates of secondary alcohols, Turkey red oil, and Grasselli Spreader-Sticker. Of these, Grasselli Spreader-Sticker containing essentially sodium oleyl sulfate and a synthetic resinous sticker is the preferred agent. Additional illustrative examples are:

$$CH_3(CH_2)_7CH{=}CH(CH_2)_7COOC_2H_4SO_3Na$$
$$CH_3(CH_2)_7CH{=}CH(CH_2)_7CONHC_2H_4SO_3Na$$

dioctyl ester of sodium sulfo succinate, arylalkenoxy sulfonates, mahogany soaps, sulfonated aromatic and mixed alkylaryl sulfonated derivatives, sodium m-nitrobenzenesulfonate, sodium naphthenic sulfonate, sodium alkylnaphthalene sulfonate, sodium disulfonate of dibutylphenylphenol, esters of fatty acids such as glyceryl monolaurate, sorbitan monostearate, mannitan monolaurate, pine oils, and clays, particularly bentonite for its adhesive action. Calcium caseinate, preferably in concentrations of 0.05% to 0.1% is one of the preferred sticking agents. Butyl acetyl ricinoleate, glyceryl acetyl ricinoleate, and hydrocarbon sulfones may also be used in the preparation of dispersions in liquids of arylidene alicyclic ketones without departing from the scope and spirit of this invention. The separate ingredients from which soap is formed, namely alkali and animal or vegetable oil, may also be employed to obtain the above described dispersed systems. Difficulty in making lubricating oil emulsions together with the arylidene alicyclic ketones and whale oil soaps may be overcome by dissolving about four ounces of an alkyl cresol in three quarts of oil, then adding the soap to make a stock miscible oil which can be mixed readily with water whenever emulsions are prepared. Vegetable oils such as rape, corn, cottonseed, linseed, soybean, olive, sesame, and castor oils may also be employed with any combination of the arylidene alicyclic ketones.

Instead of employing the unsubstituted arylidene alicyclic ketonic compounds, satisfactory insecticidal compositions are also obtained by using, as an active ingredient, the substituted derivatives thereof, particularly those having the general structural formula 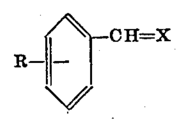 wherein R represents at least a single halogen atom, hydrocarbon radical, nitro group or hydroxyl group attached to a nuclear carbon atom, and X is a saturated or unsaturated alicyclic ring having a ketonic oxygen atom in ortho position, the remaining bonds of the nuclear carbon atoms being satisfied by either hydrogen atoms, halogen atoms or hydrocarbon, preferably lower alkyl radicals. The alicyclic ketonic radical preferably contains 5 or 6 nuclear carbon atoms. The following are illustrative examples of these substituted benzylidene alicyclic ketonic compounds:

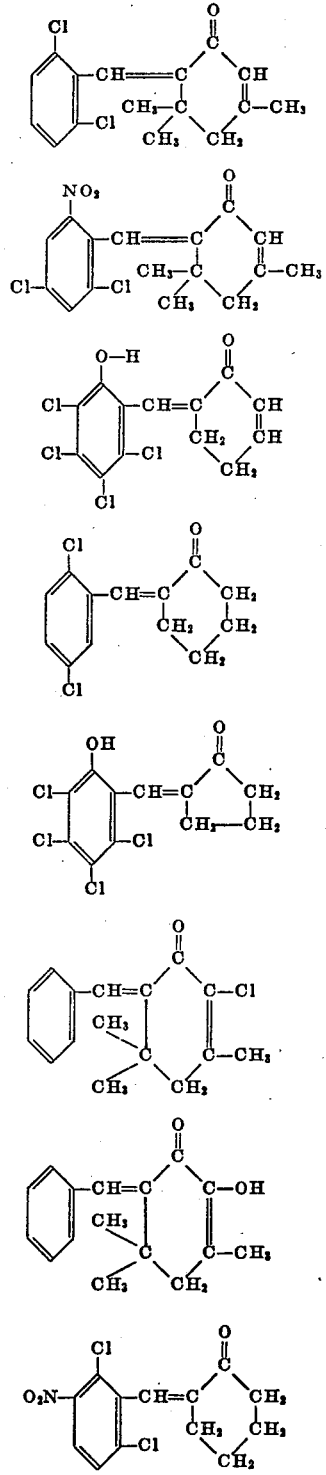

These novel substituted, particularly halo-substituted, benzylidene alicyclic ketones may be, for example, prepared by condensation of the corresponding halogenated benzaldehyde and the required alicyclic ketone in the presence of an alkali. The various halogenated benzaldehydes required as the starting materials may be produced in the following ways.

2,6-dichlorobenzaldehyde is produced by oxidizing 2,6-dichlorotoluene with manganese dioxide and sulfuric acid. The resultant 2,6-dichlorobenzaldehyde may then be nitrated to give 2,6-dichloro-3-nitrobenzaldehyde. The latter is condensed with cyclohexanone in the presence of an alkali to produce 2,6-dichloro-3-nitrobenzylidene cyclohexanone.

2,6-dichlorobenzaldehyde is also produced by reacting two mols of chlorine with one mol of 2,6-dichlorotoluene while boiling in sunlight to form 2,6-dichlorobenzalchloride, the latter being then hydrolyzed with concentrated (98% by weight) sulfuric acid at 90–100° C., followed by cooling and pouring onto ice, whereupon 2,6-dichlorobenzaldehyde is obtained. The latter is condensed with isophorone in the presence of an alkali to produce 2,6-dichlorobenzylidene isophorone.

2,5-dichlorobenzaldehyde is produced by the treatment of benzaldehyde with antimony pentachloride and iodine.

2,3,4,6-tetrachlorobenzalchloride is prepared by chlorinating 2,3,4,6-tetrachlorotoluene while boiling. 2,3,4,6-tetrachlorobenzalchloride is hydrolyzed with concentrated sulfuric acid at 90–100° C. to produce 2,3,4,6-tetrachlorobenzaldehyde. The latter condenses with isophorone in the presence of an alkali to produce 2,3,4,6-tetrachlorobenzylidene isophorone.

Pentachlorobenzaldehyde is prepared by treating pentachlorobenzalchloride with fuming sulfuric acid at 40–50° C., followed by cooling and pouring onto ice. The product, pentachlorobenzaldehyde is condensed with isophorone in the presence of an alkali to produce pentachlorobenzylidene isophorone.

4,6-dichloro-2-nitrobenzaldehyde is obtained by hydrolyzing 4,6-dichloro-2-nitrobenzalchloride. The latter is prepared by reacting two mols of chlorine with 4,6-dichloro-2-nitro-toluene while boiling this compound. 4,6-dichloro-2-nitrobenzaldehyde is condensed with isophorone in presence of an alkali to produce 4,6-dichloro-2-nitrobenzylidene isophorone.

2-hydroxy-3,4,5,6-tetrachlorobenzal chloride is obtained by chlorination of ortho-methyl phenol. The product, an aromatic hydroxy polychlorinated benzalchloride, is hydrolyzed to 2-hydroxy-3,4,5,6-tetrachlorobenzaldehyde. The latter is then reacted with cyclohexenone in the presence of an alkali to produce 2-hydroxy-3,4,5,6-tetrachlorobenzylidene cyclohexenone.

The present application is a continuation-in-part of the copending application Serial No. 551,419, filed August 14, 1944.

We claim as our invention:

1. An insecticidal composition comprising a petroleum hydrocarbon of the kerosene boiling range, an emulsifying agent and benzylidene isophorone.

2. An insecticidal composition comprising a petroleum hydrocarbon of the kerosene boiling range and benzylidene isophorone.

3. An insecticidal composition comprising a petroleum hydrocarbon of the kerosene boiling range and a benzylidene alicyclic ketone.

4. An insecticidal composition comprising a chloro-substituted benzylidene alicyclic ketone, a carrier therefor, and an emulsifying agent.

5. An insecticidal composition comprising a petroleum hydrocarbon of the kerosene boiling range and a chloro-substituted benzylidene alicyclic ketone.

6. An insecticidal composition comprising a petroleum hydrocarbon of the kerosene boiling range and a halogen-substituted arylidene alicyclic ketone in which the alicyclic ring contains 6 nuclear carbon atoms and the ketonic oxygen is attached to the carbon atom in the ortho position.

7. An insecticidal composition comprising a compound having the general structural formula:

Ar—CH=X wherein Ar represents an aryl radical and X is selected from the group consisting of 5 and 6 nuclear carbon atom alicyclic ketonic rings, said ring containing a ketonic oxygen atom on the carbon atom in ortho position, a carrier for said compound and an emulsifying agent.

8. An insecticidal composition comprising a petroleum hydrocarbon of the kerosene boiling range and a compound having the general structural formula Ar—CH=X wherein Ar represents an aryl radical and wherein X is selected from the group consisting of 5 and 6 nuclear carbon atom alicyclic rings, said ring containing a ketonic oxygen atom on the carbon atom in the ortho position.

9. An insecticidal composition comprising benzylidene isophorone and pyrethrum.

10. An insecticidal composition comprising benzylidene isophorone, pyrethrum, and a normally liquid hydrocarbon.

11. An insecticidal composition comprising an insecticidal plant extract from the class consisting of pyrethrum and rotenone and a compound having the general structural formula Ar—CH=X wherein Ar represents an aryl radical and X is selected from the group consisting of 5 and 6 nuclear carbon atom alicyclic ketonic rings, said ring containing a ketonic oxygen atom on the carbon atom in the ortho position.

STEPHEN C. DORMAN.
SEAVER A. BALLARD.

REFERENCES CITED

The following references are of record in the file of this patent:

UNITED STATES PATENTS

| Number | Name | Date |
|---|---|---|
| 2,307,482 | Ballard et al. | Jan. 5, 1943 |

OTHER REFERENCES

Chem. Abstracts, 1930, page 2730, by Cornubert et al.

Roarck—Soap & Sanit. Chem., Jan. 1943, pages 95, 96.